US008237077B2

(12) United States Patent
Liu

(10) Patent No.: US 8,237,077 B2
(45) Date of Patent: Aug. 7, 2012

(54) ELECTRODE TUBE HOLDING APPARATUS FOR ELECTRIC DISCHARGE MACHINE

(75) Inventor: Hai-Zhong Liu, Taichung (TW)

(73) Assignee: Max See Industry Co., Ltd., Taichung (TW)

( * ) Notice: Subject to any disclaimer, the term of this patent is extended or adjusted under 35 U.S.C. 154(b) by 553 days.

(21) Appl. No.: 12/534,873

(22) Filed: Aug. 4, 2009

(65) Prior Publication Data

US 2011/0031221 A1 Feb. 10, 2011

(51) Int. Cl.
*B23H 1/04* (2006.01)

(52) U.S. Cl. .................................................. 219/69.15

(58) Field of Classification Search .................. None
See application file for complete search history.

(56) References Cited

U.S. PATENT DOCUMENTS 4,475,996 A * 10/1984 Inoue ............................ 205/670
2005/0077269 A1 * 4/2005 Yokomichi ................... 219/69.2

* cited by examiner

*Primary Examiner* — David E Graybill
(74) *Attorney, Agent, or Firm* — Pai Patent & Trademark Law Firm; Chao-Chang David Pai

(57) ABSTRACT

An electrode tube holding apparatus is mounted to an electric discharge machine (EDM). The holding apparatus is slidable upward and downward along with the spindle of the EDM and maintained within the midsection of an electrode tube for reducing the deformation of the electrode tube during its movement.

4 Claims, 4 Drawing Sheets

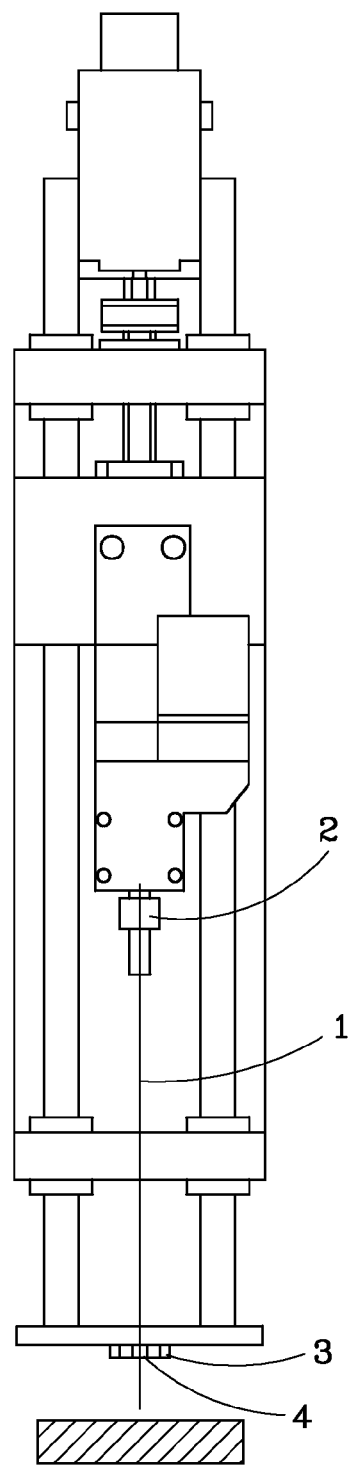
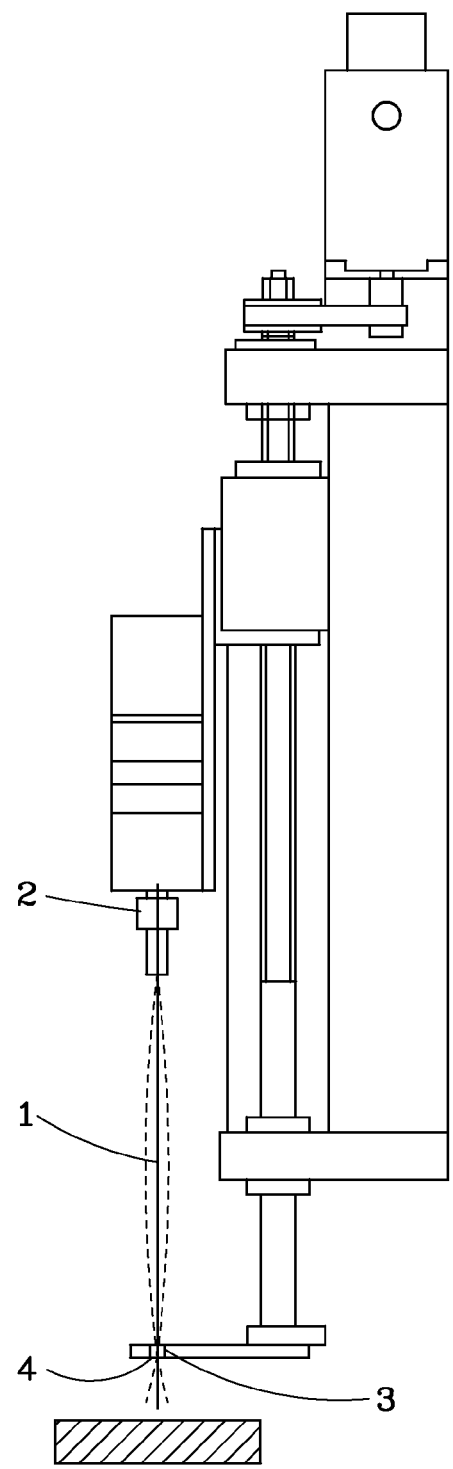
FIG. 1
PRIOR ART
FIG. 2
PRIOR ART

ELECTRODE TUBE HOLDING APPARATUS FOR ELECTRIC DISCHARGE MACHINE

BACKGROUND OF THE INVENTION

1. Field of the Invention

The present invention relates generally to electric discharge machines (EDM) and more particularly to an electrode tube holding apparatus for an EDM.

2. Description of the Related Art

A general EDM works like that a rotatable chuck mounted to a spindle thereof holds and drives an electrode tube to rotate and eject high-pressure machining liquid and then electro-discharge machining is applied to a workpiece after the electrode tube is electrified, whereby a deep hole is formed in the workpiece for the machining purpose. Referring to FIGS. 1-2, the electrode tube 1 of the conventional EDM is held at the rotatable chuck 2 and at a die guide 4 of a die guide holder 3 below the spindle 5. As shown in FIG. 2, while the electro-discharge machining proceeds, some deviations will occur between the axis of the rotatable chuck 2 and the axis of the electrode tube 1 and such deviations will result in deformation of the electrode tube 1 due to centrifugal effect while the electrode tube 1 is rotated. Although the electrode tube 1 is held by the die guide 4, the length of the electrode tube 1 causes the centrifugal effect on itself to incur excursion of its distal end, which has become a serious problem. When such excursion is slight, some problems may happen, like deviation of the hole or enlarged diameter of the hole after machining. When such excursion is serious, it may even disable the EDM from normal operation. In this way, the conventional EDM is too unstable to apply the electro-discharge machining to the microminiature hole.

SUMMARY OF THE INVENTION

The primary objective of the present invention is to provide an electrode tube holding apparatus for an EDM, wherein the electrode tube can avoid deformation.

The foregoing objective of the present invention is attained by the electrode tube holding apparatus. The EMD comprises a main body and a rise-and-fall member. The electrode tube holding apparatus comprises a gear wheel, a cantilever, and a rope. The gear wheel is pivotably attached to the rise-and-fall member and has a post. The gear wheel and the post can be rotated along with the movement of the rise-and-fall member. The cantilever is slidably mounted to the main body, having at least one guide hole running therethrough for inserting an electrode tube mounted to the rise-and-fall member. The rope has two ends connected with the cantilever and the post respectively. When the gear wheel is rotated, the post is rotated to wind or unwind the rope to further move the cantilever upward or downward; meanwhile, the cantilever is slidable along the main body and maintained within the midsection of the electrode tube.

BRIEF DESCRIPTION OF THE DRAWINGS

FIG. 1 is a front view of the conventional EDM.
FIG. 2 is a side view of the conventional EDM.

DETAILED DESCRIPTION OF PREFERRED EMBODIMENTS

Figure 3:
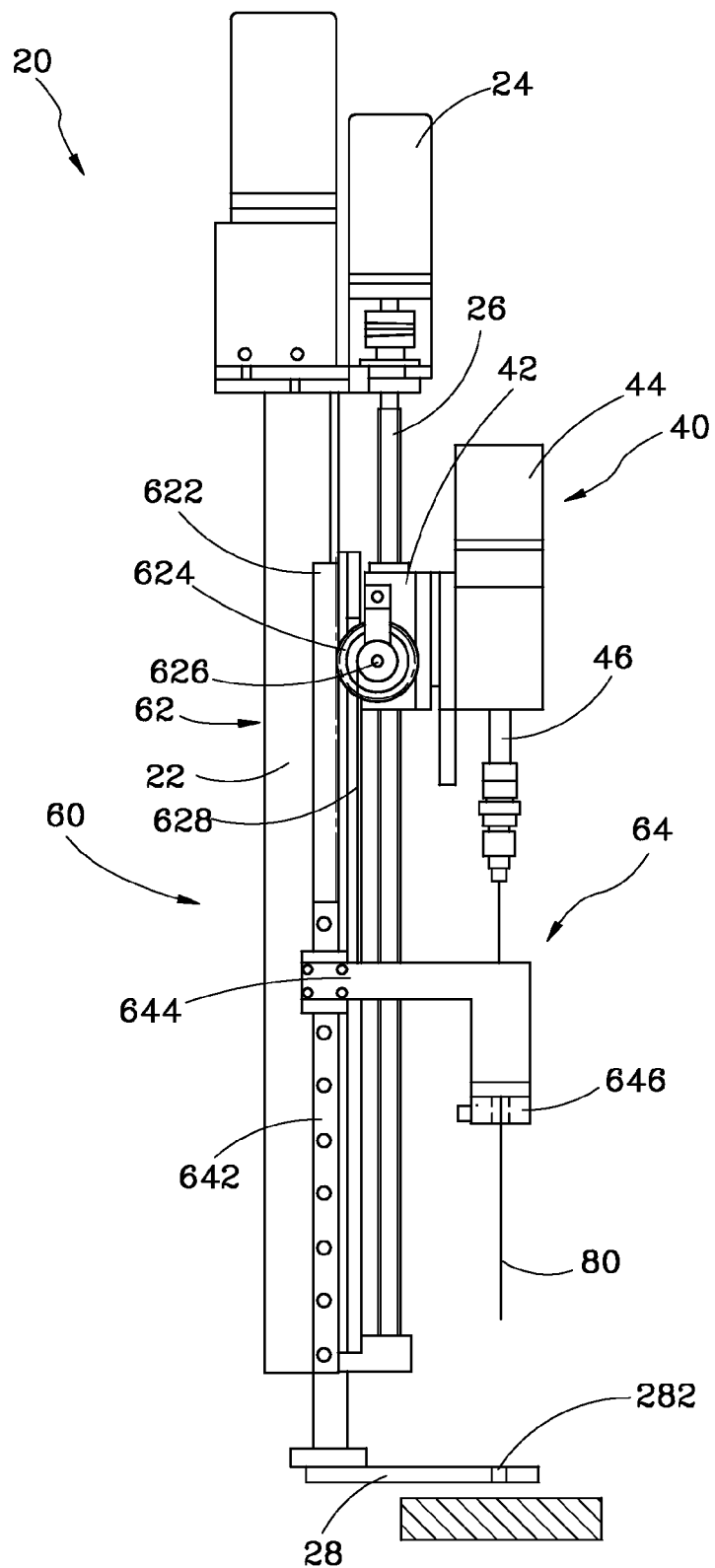
FIG. 3 is a front view of a preferred embodiment of the present invention.
Figure 4:
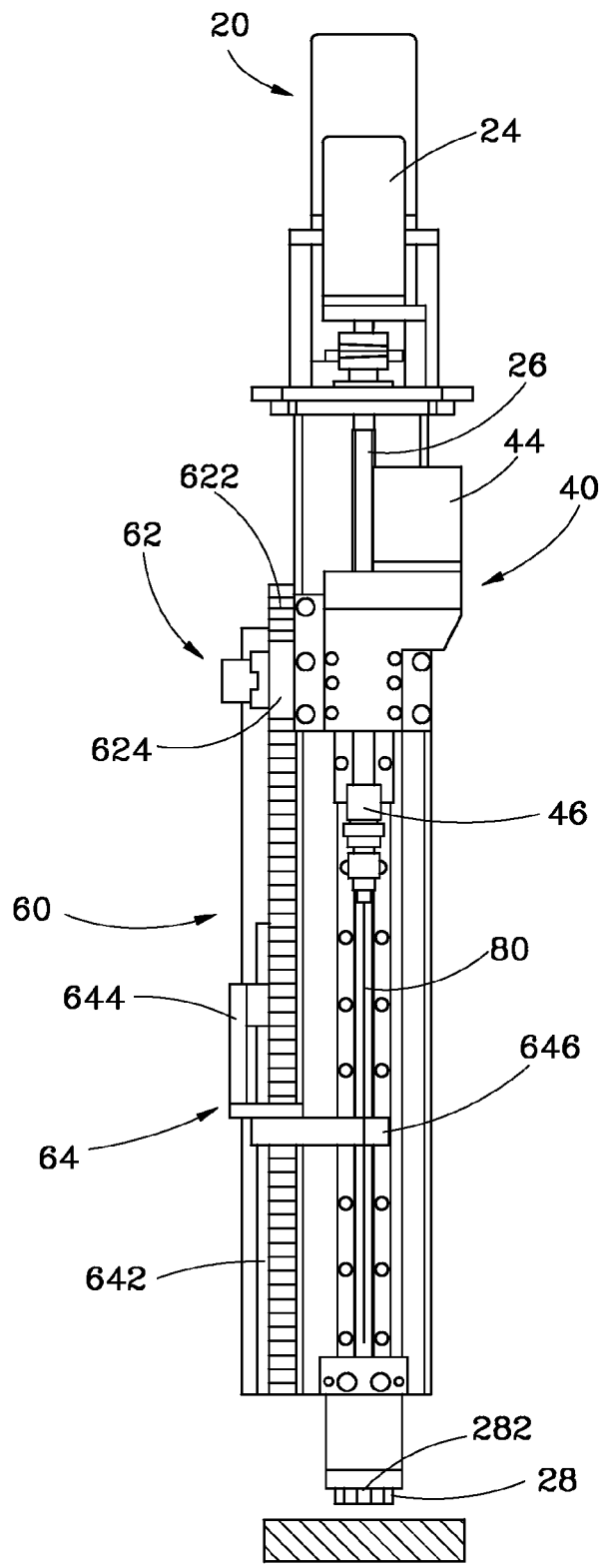
FIG. 4 is a side view of the preferred embodiment of the present invention.
Figure 5:
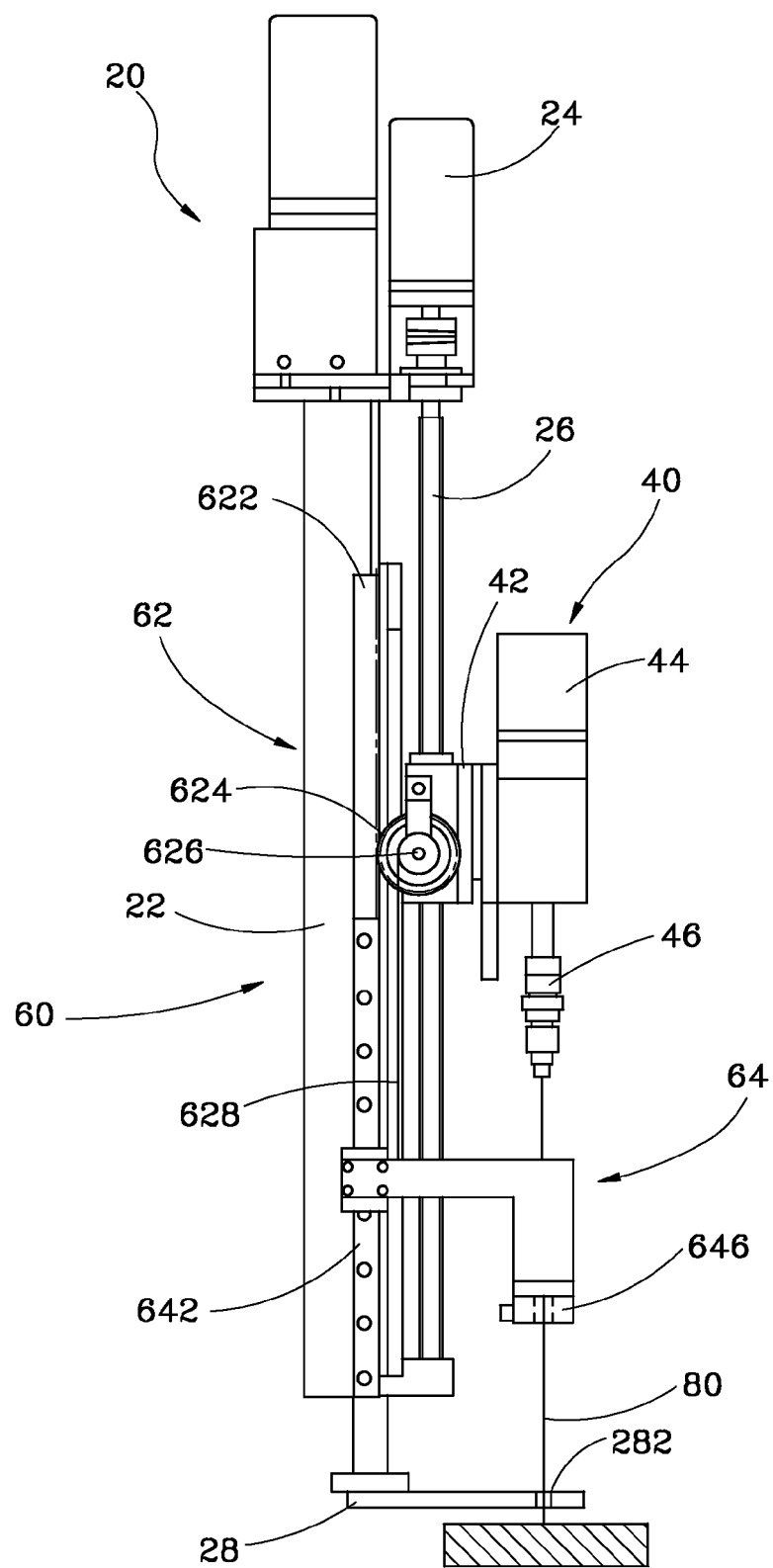
FIG. 5 is a schematic view of the preferred embodiment of the present invention in operation.

Referring to FIGS. 3-5, an electrode tube holding apparatus 60 for an EDM in accordance with a preferred embodiment of the present invention comprises a drive assembly 62 and a holding assembly 64. The EDM comprises a base frame 20, a spindle 40, and an electrode tube 80 mounted to the spindle 40.

The base frame 20 includes a main body 22, a first motor 24, a screw rod 26, and a die guide holder 28. The main body 22 is mounted upright to the EDM and movable along the vertical-axis or the horizontal-axis. The first motor 24 is fixed to a top end of the main body 22. The screw rod 26 has a top end and a bottom end, the former of which is fixed to an output shaft of the first motor 24 via a coupling and the latter of which is rotatably attached to the main body 22. The screw rod 26 can be driven by the first motor 24 to rotate clockwise or counterclockwise. The die guide holder 28 is fixed to a bottom side of the main body 22, having a die guide 282 for inserting the electrode tube 80 therethrough for the electro-discharge machining.

The spindle 40 includes a rise-and-fall member 42, a second motor 44, and a chuck 46. The rise-and-fall member 42 is mounted to the screw rod 26 for ascension and descension while the screw rod 26 is rotated. The second motor 44 is mounted to the rise-and-fall member 42. The chuck 46 can be driven by the second motor 44 for holding the electrode tube 80.

The holding apparatus 60 includes a drive assembly 62 and a holding assembly 64. The drive assembly 62 has a gear rack 622, a gear wheel 624, a post 626 mounted to the gear wheel 624, and a rope 628. The gear rack 622 is fixed to a left side of the main body 22. The gear wheel 624 is pivotably attached to the rise-and-fall member 42 and engaged with the gear rack 622. The post 626 is rotated along with the gear wheel 624. The rope 628 is a cable wire in this embodiment, having a top end and a bottom end, the former of which is fixedly connected with the post 626 and the latter of which is mounted to the holding assembly 64. Along with the rotation of the post 626, the rope 628 can be wound or unwound to further drive the holding assembly 64. It is to be noted that the winding/unwinding direction of the rope 628 is converse to the upward/downward moving direction of the rise-and-fall member 42. Namely, while the rope 628 is wound, the rise-and-fall member 42 is slidably moved downward. The diameter of the post 626 is a half of that of the gear wheel 624, such that the length for which the rope 628 is wound/unwound is a half of the distance for which the rise-and-fall member 42 is moved downward/upward.

The holding assembly 64 includes a guide rail 642, a cantilever 644, and two holding members 646. The guide rail 642 is parallel to the gear rack 622 and fixed to a left side of the gear rack 622. The cantilever 644 has a rear end slidably mounted to the guide rail 642 and fixed to a bottom end of the rope 628 for upward and downward sliding driven by the rope 628. The cantilever 644 has at least one guide hole running therethrough for inserting the electrode tube 80. Each of the holding members 646 has one end pivotably attached to a front end of the cantilever 644 for pivoting movement between a holding position and a retaining position on a pivot. While at the holding position, the holding member 646 holds the electrode tube. While at the retaining position, the electrode tube 80 is movable between the two holding members 646 for adjusting the electrode tube to a proper position before it is held.

When the EDM machines a workpiece, the workpiece is first fixed to a predetermined position under the spindle 40; meanwhile, each of the holding members 646 is at the retaining position, the electrode tube 80 is inserted through the holding member 646 and the die guide 282, and then the holding member 646 is moved to the holding position. Next, the electrode tube 80 is electrified for discharge machining As shown in FIG. 5, when the first motor 24 drives the screw rod 26 to rotate and the rise-and-fall member 42 descends, the bottom end of the electrode tube 80 approaches the workpiece to apply the discharge machining to the workpiece. Meanwhile, the gear wheel 624 pivotally attached to the rise-and-fall member 42 and engaged with the gear rack 622 is driven to rotate the post 626 in such a way that the distance for which the holding member 646 ascends is a half of the distance for which the rise-and-fall member 42 descends. In this way, the holding member 646 remains positioned at a midsection of the electrode tube 80.

In conclusion, the present invention includes the following advantages.

1. Since the top end, the midsection, and the lower part of the electrode tube 80 are respectively held by the chuck 46, the holding members 646, and the die guide 282, it can indeed reduce the deformation of the electrode tube 80 due to the deviation between the axis of the chuck 46 and the axis of the electrode tube 80, thus preventing the machined hole from expanding.
2. The holding apparatus of the present invention can lessen the deformation of the electrode tube 80, such that the electrode tube 80 remains straight to enable the discharge machining to meet the requirement for precision. Under the circumstances, the stability of overall discharge machining can be enhanced.

Although the present invention has been described with respect to a specific preferred embodiment thereof, it is in no way limited to the specifics of the illustrated structures but changes and modifications may be made within the scope of the appended claims.

What is claimed is:

1. An electrode tube holding apparatus for an EDM, the EDM having a main body and a rise-and-fall member slidably mounted to the main body, comprising:
    a gear wheel pivotably attached to the rise-and-fall member and having a post, the gear wheel and the post being rotatable along with the movement of the rise-and fall member;
    a cantilever slidably mounted to the main body and having at least one guide hole running therethrough for inserting an electrode tube mounted to the rise-and-fall member; and
    a rope having two ends connected with the cantilever and the post respectively; whereby when the gear wheel is rotated, the post is rotated to wind or unwind the rope to further drive the cantilever upward or downward.

2. The electrode tube holding apparatus as defined in claim 1, wherein when the rope is wound the rise-and-fall member moves downward; when the rope is unwound the rise-and-fall member moves upward; and the diameter of the post is a half of that of the gear wheel.

3. The electrode tube holding apparatus as defined in claim 1, further comprising a gear rack attached to the main body, the gear wheel pivotally attached to the rise-and-fall member and engaged with the gear rack.

4. The electrode tube holding apparatus as defined in claim 1, further comprising two holding members, wherein each of the holding members has an end pivotably attached to the cantilever for pivoting movement between a holding position and a retaining position; while the holding member is located at the holding position, each of the holding members holds the electrode tube; while the holding member is located at the retaining position, the electrode tube is movable between the holding members.

* * * * *